(12) United States Patent
Lee et al.

(10) Patent No.: US 12,194,443 B2
(45) Date of Patent: Jan. 14, 2025

(54) NANO-HYBRID CATALYST FOR HYDROGEN PRODUCTION AND METHOD FOR MANUFACTURING THE SAME

(71) Applicant: POSTECH Research and Business Development Foundation, Pohang-si (KR)

(72) Inventors: In Su Lee, Pohang-si (KR); Dutta Soumen, Pohang-si (KR); Yurim Hong, Gangneung-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 103 days.

(21) Appl. No.: 18/047,028

(22) Filed: Oct. 17, 2022

(65) Prior Publication Data
US 2023/0311102 A1    Oct. 5, 2023

(30) Foreign Application Priority Data

Mar. 30, 2022    (KR) .......................... 10-2022-0039906

(51) Int. Cl.
| | | |
|---|---|---|
| *B01J 23/89* | (2006.01) | |
| *B01J 35/00* | (2024.01) | |
| *B01J 37/04* | (2006.01) | |
| *B01J 37/06* | (2006.01) | |
| *C01B 32/162* | (2017.01) | |

(52) U.S. Cl.
CPC ............ *B01J 23/8906* (2013.01); *B01J 35/19* (2024.01); *B01J 37/04* (2013.01); *B01J 37/06* (2013.01); *C01B 32/162* (2017.08)

(58) Field of Classification Search
CPC ........ B01J 23/8906; B01J 35/19; B01J 37/04; B01J 37/06; C01B 32/162
See application file for complete search history.

(56) References Cited

FOREIGN PATENT DOCUMENTS

| KR | 10-1168653 | 7/2012 |
|---|---|---|
| KR | 10-2019-0051557 | 5/2019 |
| KR | 10-2021-0141812 | 11/2021 |

OTHER PUBLICATIONS

Donald B Peck—Miller Indices, last updated Aug. 23, 2021.*
Jang et al., ACS Nano, (2020), v.14, 10578-10588.*
Jang et al., ACS Nano, (2020), v.14, 10578-10588, supporting information.*
Jang, S. W., et al., "Holey Pt Nanosheets on NiFe-Hydroxide Laminates: Synergistically Enhanced Electrocatalytic 2D Interface toward Hydrogen Evolution Reaction", ACS nano, 2020, vol. 14, No. 8, (Jul. 27, 2020) pp. 10578-10588.
Xu, D., et al., "Crystalline Facet-Directed Generation Engineering of Ultrathin Platinum Nanodendrites", The journal of physical chemistry letters, 2019, vol. 10, No. 8, (Jan. 25, 2019) pp. 663-671.
Hong, Y.-R., et al., "Crystal Facet-Manipulated 2D Pt Nanodendrites to Achieve an Intimate Heterointerface for Hydrogen Evolution Reaction", Journal of the American Chemical Society, 2022, (Apr. 29, 2022), vol. 144, No. 20, pp. 9033-9043.
Kipo, PCT Search Report & Written Opinion of PCT/KR2022/016029 dated Jan. 25, 2023.
Xueqing Yu et al, "Sub-Nanometer Pt Clusters on Defective NiFe LDH Nanosheets as Trifunctional Electrocatalysts for Water Splitting and Rechargeable Hybrid Sodium-Air Batteries", ACS Appl. Mater. Interfaces 2021, 13, 23, p. 26891~26903, Jun. 7, 2021.
Sengeni Anantharaj et al, "Enhancing electrocatalytic total water splitting at few layer Pt-NiFe layered double hydroxide interfaces", Nano Energy 39, p. 30~43, Jun. 22, 2017.

* cited by examiner

*Primary Examiner* — Yong L Chu
(74) *Attorney, Agent, or Firm* — LEX IP MEISTER, PLLC

(57) ABSTRACT

Present exemplary embodiments provide a nano-hybrid catalyst including: a two-dimensional platinum (Pt) nanodendrite sheet layer with a controlled crystal plane; and a NiFe layered double hydroxide nanosheet layer, in which the two-dimensional platinum (Pt) nanodendrite sheet layer with the controlled crystal plane and the NiFe layered double hydroxide nanosheet layer are alternately stacked, and a method for manufacturing the same.

13 Claims, 16 Drawing Sheets

NANO-HYBRID CATALYST FOR HYDROGEN PRODUCTION AND METHOD FOR MANUFACTURING THE SAME

TECHNICAL FIELD

Embodiments of the present invention relate to a nano-hybrid catalyst for alkaline hydrogen production that can be used efficiently for a long time, and a method for manufacturing the same, and more particularly, to a nano-hybrid catalyst for alkaline hydrogen production containing two-dimensional platinum (Pt) nano-dendrites with a controlled crystal plane for the formation of heterointerface, and a method for manufacturing the same.

BACKGROUND ART

Hydrogen energy is attracting worldwide attention as an eco-friendly new and renewable energy source because the hydrogen energy has little problems with harvestable quantity and local ubiquity and is easy to store and emits almost no pollution when used as an energy source. Alkaline water electrolysis coupled with renewable energy is in the limelight as a simple technology to produce hydrogen for end-use and energy storage media, and the most important thing in improving the efficiency of alkaline water decomposition is to secure a high-activity water decomposition catalyst manufacturing technology.

Platinum (Pt)-based catalysts are widely used as efficient catalysts for water decomposition because alkaline hydrogen evolution reaction (HER) proceeds through acidophilic metal-hydroxide surface hybridization. However, in the case of the existing Pt catalyst, the shape and size of Pt particles are non-uniform and an interface structure is not optimized, so there is a problem in that the efficiency of the Pt catalyst is low and the Pt catalyst is not suitable for stable use for a long time.

To solve the above problem, a heterogeneous interfacial structure designed by binding heterogeneous materials may improve the activity of the catalyst by increasing the number of active sites and controlling the electronic structure of components and the binding to reactive species. By exploiting the synergistic effect of integrating complementary properties, as demonstrated in various electrocatalysts, strongly coupled heterogeneous interfaces between metals and hydroxides often accelerate reaction rates and promote operational stability. For example, the Pt/Ni(OH)$_2$ hybrid exhibits improved HER activity by the combination of Ni(OH)$_2$ with excellent water decomposition ability and Pt with excellent hydrogen bonding ability, which may solve a problem of low HER reaction rate in alkaline medium. Specifically, Ni(OH)$_2$ promotes the rapid adsorption and decomposition of H$_2$O molecules, which is a bottleneck step of the HER of the Pt catalyst, and the electronic interaction between Pt and Ni(OH)$_2$ favorably maintains the adsorption/desorption balance of reactive species such as H*, OH$_{ads}$ intermediates and H$_2$ products. In previous studies through these methods, remarkably enhanced HER activity was demonstrated at 0D and 1D interfaces of Pt nanocrystals, nanowires, or nanofibers in contact with the 2D-Ni(OH)$_2$ surface. However, the above study does not consider components that improve the catalytic activity, such as the large aspect of the 2D hydroxide and the exposure of the single crystal grain surface, and seldom considers critical parameters for effective and strong interfacial interactions, such as the shape/size and crystal plane contact of component materials.

Recently, methods for expanding Pt growth on the surface around 2D NiFe-LDH (layered double hydroxide), and forming a maximally contacted heterointerface have been proposed, but in the interfacial structure formed by depositing a secondary component (Pt) on a preformed substrate Ni(OH)$_2$, the contact crystal plane of the secondary material being grown is limited by the existing surface of the primary component. Therefore, in order to optimize the contact with the Ni(OH)$_2$ surface, it is necessary to design the crystal plane of the interfacial contact to which the most suitable Pt facet may be bonded.

DISCLOSURE

Technical Problem

The present invention has been made in an effort to provide a nano-hybrid catalyst for hydrogen production and a method for manufacturing the same having advantages of improving stability and activity to be used for water electrolysis by effectively contacting two-dimensional platinum (Pt) nanodendrites (2D-PtND), which are heterogeneous materials with a controlled crystal plane, and a layered double hydroxide (LDH).

Technical Solution

An exemplary embodiment of the present invention provides a nano-hybrid catalyst, including: a two-dimensional platinum (Pt) nanodendrite sheet layer with a controlled crystal plane; and a NiFe layered double hydroxide nanosheet layer, in which the two-dimensional platinum (Pt) nanodendrite sheet layer with the controlled crystal plane and the NiFe layered double hydroxide nanosheet layer are alternately stacked.

In the two-dimensional platinum (Pt) nanodendrite sheet layer with the controlled crystal plane, flat layered Pt nanocrystal particles including a (100) plane, a (110) plane, and a (111) plane may be interconnected.

In the two-dimensional platinum (Pt) nanodendrite sheet layer with the controlled crystal plane, the (110) plane of the Pt nanocrystal particles may be exposed, the layered Pt nanocrystal particles may have a plate shape in which the (100) plane and the (111) plane surround a periphery of the (110) plane, an average width of the (110) plane may be in a range of 2.0 nm to 3.5 nm, and a thickness of the plate may be in a range of 1.0 nm to 2.0 nm based on the (110) plane.

The (110) plane of the nanocrystal particles of the two-dimensional platinum (Pt) nanodendrite sheet layer with the controlled crystal plane may be in close contact with a (001) plane of the NiFe layered double hydroxide nanosheet layer.

In the two-dimensional platinum (Pt) nanodendrite sheet layer with the controlled crystal plane, based on a widest surface, an average width may be in a range of 200 nm to 300 nm, and a thickness may be in the range of 1.0 nm to 2.0 nm.

In the NiFe layered double hydroxide nanosheet layer, based on a widest surface, an average width may be in a range of 150 nm to 200 nm, and an average thickness may be in a range of 0.5 nm to 1.0 nm.

Another embodiment of the present invention provides a method for manufacturing a nano-hybrid catalyst, including: preparing a colloidal solution of the two-dimensional platinum (Pt) nanodendrite sheet with the controlled crystal plane; obtaining agglomerates by adding dropwise the colloidal solution of the two-dimensional platinum (Pt) nanodendrite sheet with the controlled crystal plane to a formamide suspension of the NiFe layered double hydroxide sheet while stirring; and separating and washing the obtained agglomerates.

The preparing of the colloidal solution of the two-dimensional platinum (Pt) nanodendrite sheet with the controlled crystal plane may include: mixing an aqueous suspension of a 2D-hollow silica nanoreaction group with $Na_2PtCl_4 \cdot xH_2O$ to obtain a mixed suspension; adding an acid solution to the mixed suspension and stirring the mixture under heating conditions to obtain a first precipitate; separating and washing the first precipitate and then mixing the acid solution to obtain a second precipitate; and separating and washing the second precipitate to obtain the two-dimensional platinum (Pt) nanodendrite sheet with the controlled crystal plane and mixing the two-dimensional platinum (Pt) nanodendrite sheet with the controlled crystal plane with distilled water.

The 2D-hollow silica nanoreaction group may be manufactured by obtaining silica on a surface of a NiCo layered double hydroxide nanosheet to obtain a NiCo layered double hydroxide nanosheet (LDH@(dl)SiO$_2$) formed with a layered double silica shell, and dispersing the NiCo layered double hydroxide nanosheet (LDH@(dl)SiO$_2$) formed with the layered double silica shell layer in the acid solution to obtain a 2D-hollow silica nanosheet (h-(dl)SiO$_2$) including a layered double shell from which the NiCo layered double hydroxide nanosheet is removed.

In the coating of the silica on the surface of the NiCo layered double hydroxide nanosheet to obtain the NiCo layered double hydroxide nanosheet (LDH@(dl)SiO$_2$) formed with the layered double silica shell, after forming the silica shell layer modified with aminosilane on the surface of the NiCo layered double hydroxide nanosheet, a pure silica shell layer may be additionally formed around the silica shell layer modified with the aminosilane.

In the forming of the silica shell layer modified with the aminosilane on the surface of the NiCo layered double hydroxide nanosheet, after adding dropwise the aqueous suspension of the NiCo layered double hydroxide nanosheet to a mixed solution of IGEPAL CO-520 and cyclohexane while stirring to obtain a suspension, the silica shell layer modified with the aminosilane may be formed by adding a mixture of TMSD and TEOS to a silane mixture and maintaining the mixture for a predetermined time while stirring.

The silane mixture may be the mixture of the TMSD and TEOS in a range of 1:99 to 5:95 by volume.

In the additionally forming of the pure silica shell layer around the silica shell layer modified with the aminosilane, after forming the silica shell layer modified with aminosilane on the surface of the NiCo layered double hydroxide nanosheet, the TEOS may be added and maintained for a predetermined time while stirring.

The NiFe layered double hydroxide may be manufactured by mixing $NiCl_2 \cdot 6H_2O$, $FeCl_2 \cdot 4H_2O$, AQS, and HMT in a predetermined ratio to obtain a NiFe layered double hydroxide sheet into which the AQS is inserted, treating the NiFe layered double hydroxide into which the AQS is inserted with an aqueous ethanol solution containing SDS to obtain the NiFe layered double hydroxide into which DS is inserted, and mixing the NiFe layered double hydroxide into which the DS is inserted in formamide and stirring the mixture, and the $NiCl_2 \cdot 6H_2O$ and the $FeCl_2 \cdot 4H_2O$ are mixed in 2:1 based on a molar ratio of Ni and Fe.

Advantageous Effects

According to an embodiment of the present invention, a nano-hybrid catalyst for hydrogen production contains two-dimensional platinum (Pt) nanodendrites with a controlled crystal plane, thereby improving hydrogen production efficiency.

In addition, since the crystal plane-controlled two-dimensional platinum (Pt) nanodendrites and the double-layer hydroxide are alternately stacked and positioned, there is an effect of having excellent stability in a water decomposition reaction for a long time.

In addition, according to an exemplary embodiment of the present invention, a method for producing a nano-hybrid catalyst for hydrogen production can efficiently produce a catalyst for hydrogen production with excellent catalyst activity and improved stability.

DESCRIPTION OF THE DRAWINGS

FIG. 10 is a schematic diagram of two-dimensional platinum (Pt) nanodendrites (2D-PtND) in which a crystal plane with an exposed facet of 110 is controlled according to an exemplary embodiment of the present invention.

MODE FOR INVENTION

Terminologies used herein are to mention only a specific exemplary embodiment, and do not to limit the present invention. Singular forms used herein include plural forms as long as phrases do not clearly indicate an opposite meaning. The meaning "including" used in the present specification concretely indicates specific properties, areas, integer numbers, steps, operations, elements, and/or components, and is not to exclude presence or addition of other specific properties, areas, integer numbers, steps, operations, elements, and/or components thereof.

All terms including technical terms and scientific terms used herein have the same meaning as the meaning generally understood by those skilled in the art to which the present invention pertains. In addition, unless otherwise specified, % means % by weight.

Hereinafter, an exemplary embodiment of the present invention is described in detail. However, it is to be understood that this exemplary embodiment is provided as an example, and the present invention is not limited by this exemplary embodiment, but is defined by only the scope of claims to be described below.

An embodiment of the present invention may provide a nano-hybrid catalyst for alkaline hydrogen production containing a two-dimensional platinum (Pt) nanodendrite (2D-Pt nanodendrites, hereinafter referred to as 2D-PtND) with a controlled crystal plane and layered double hydroxide (hereinafter referred to as LDH). The LDH may be a material having a layered double structure in which a divalent metal and a trivalent metal are included between hydroxyl groups of two layers, and thus, anions may be exchanged between the layers. Meanwhile, the LDH may be specifically nickel-iron (Ni—Fe) layered double hydroxide (Ni—Fe layered double hydroxide, hereinafter referred to as NiFe layered double hydroxide or NiFe-LDH).

Figure 1A:
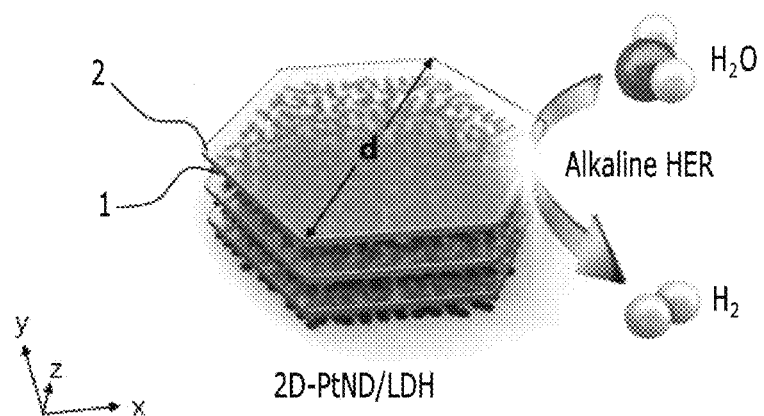
FIG. 1A is a schematic diagram of a nano-hybrid catalyst according to an exemplary embodiment of the present invention.
Figure 1B:
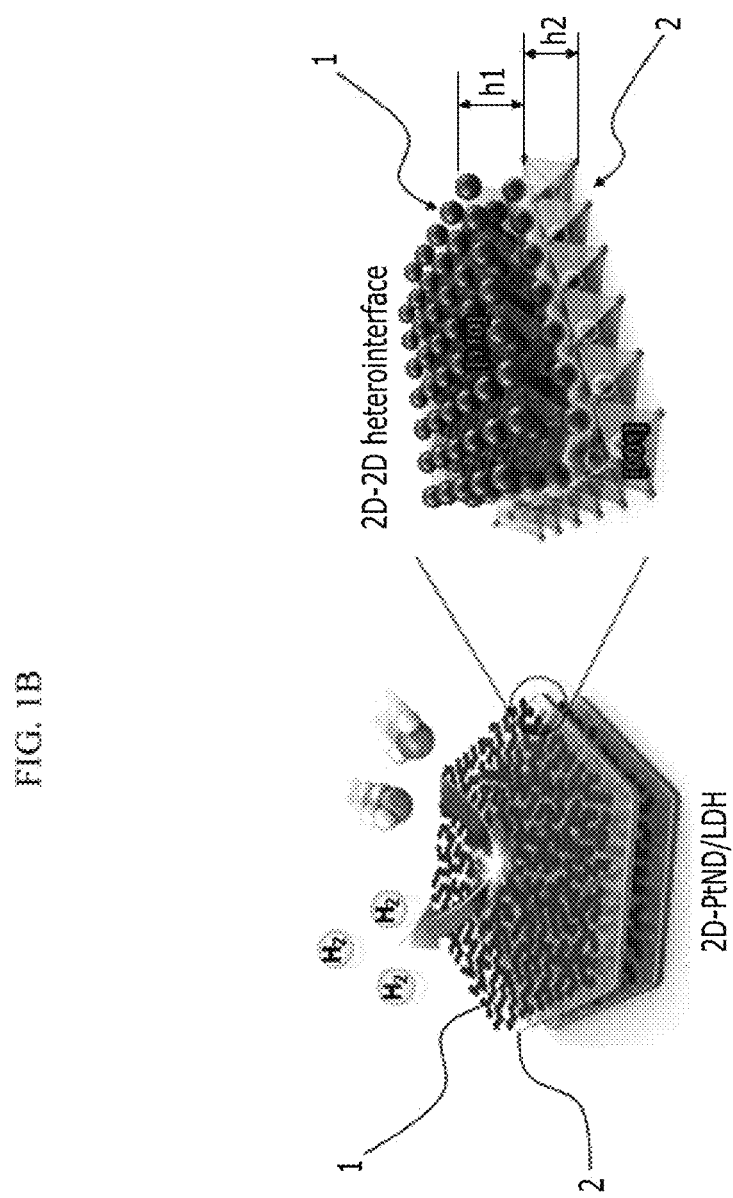
FIG. 1B is a schematic diagram of a nano-hybrid catalyst according to an exemplary embodiment of the present invention.

FIG. 1A is a schematic diagram of a nano-hybrid catalyst according to an exemplary embodiment of the present invention, FIG. 1B is an enlarged schematic diagram of the nano-hybrid catalyst according to the exemplary embodiment of the present invention, and FIG. 10 is a schematic diagram of two-dimensional platinum (Pt) nanodendrites (2D-PtND) in which a crystal plane with an exposed facet of 110 is controlled according to an exemplary embodiment of the present invention.

Figure 1C:
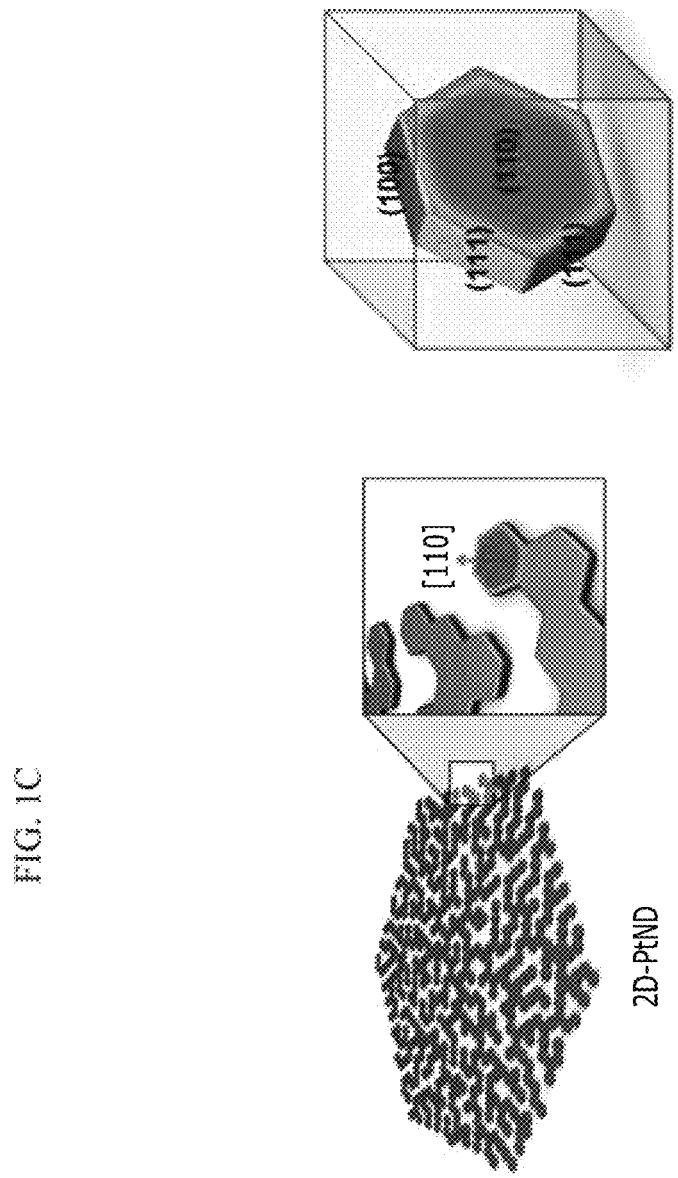

The nano-hybrid catalyst according to an embodiment of the present invention will be described with reference to FIGS. 1A to 1C.

The nano-hybrid catalyst according to the exemplary embodiment of the present invention may include a 2D-PtND sheet 1 and a NiFe-LDH nanosheet 2 that are alternately stacked. The 2D-PtND sheet and the NiFe-LDH nanosheet may have a flat plate shape, and specifically, a flat hexagonal disk shape.

A shape and size of a wide surface of the 2D-PtND sheet (x-y plane in FIG. 1A) and a shape and size of a wide surface (x-y plane in FIG. 1A) of the LDH nanosheet may correspond to each other, and an average width d of the wide surface of the 2D-PtND sheet may be in the range of 150 nm to 350 nm, and specifically, in the range of 200 nm to 300 nm. Meanwhile, based on the wide surface of the 2D-PtND sheet, a thickness h1 may be in the range of 1.0 nm to 2.5 nm, and specifically, in the range of 1.0 nm to 2.0 nm.

Meanwhile, the LDH nanosheet may be specifically a NiFe-LDH nanosheet. The average width d of the wide surface of the NiFe-LDH nanosheet may be in the range of 150 nm to 350 nm, and specifically, may be in the range of 150 nm to 200 nm, and a thickness h2 may be in the range of 0.5 nm to 1.0 nm.

When the average width and thickness of the 2D-PtND and the LDH are within the above ranges, it is advantageous to form an optimized interface structure between the 2D-PtND nanosheet and the LDH nanosheet.

The 2D-PtND sheet may be layered Pt nanocrystal particles interconnected. The layered nanocrystal particles may include a (100) plane, a (110) plane, and a (111) plane in a crystal structure, and may have a plate shape in which the (100) plane and (111) plane surround the periphery of the (110) plane. The average width of the (110) plane of the plate may be in the range of 2.0 nm to 3.5 nm, and the thickness of the plate perpendicular to the (110) plane may be in the range of 1.0 nm to 2.0 nm.

In an embodiment of the present invention, the 2D-PtND with the controlled crystal plane may be platinum (Pt) nano dendrite in which the layered Pt nanocrystal particles are interconnected to the side (111) plane and the (110) plane is exposed to the outside.

The externally exposed surface (110) plane of the Pt nanocrystal particles of the 2D-PtND sheet may be in close contact with the hydroxide-rich (001) surface of the NiFe-LDH due to high oxidative bonding affinity. Therefore, a stable heterostructure is formed between the (110) plane of the Pt nanocrystal particles and the (001) plane of the NiFe-LDH, which is advantageous for maintaining stable catalyst performance for a long time of the nano-hybrid catalyst.

In another embodiment of the present invention, a method for manufacturing a nano-hybrid catalyst for hydrogen production may be provided.

Figure 2:
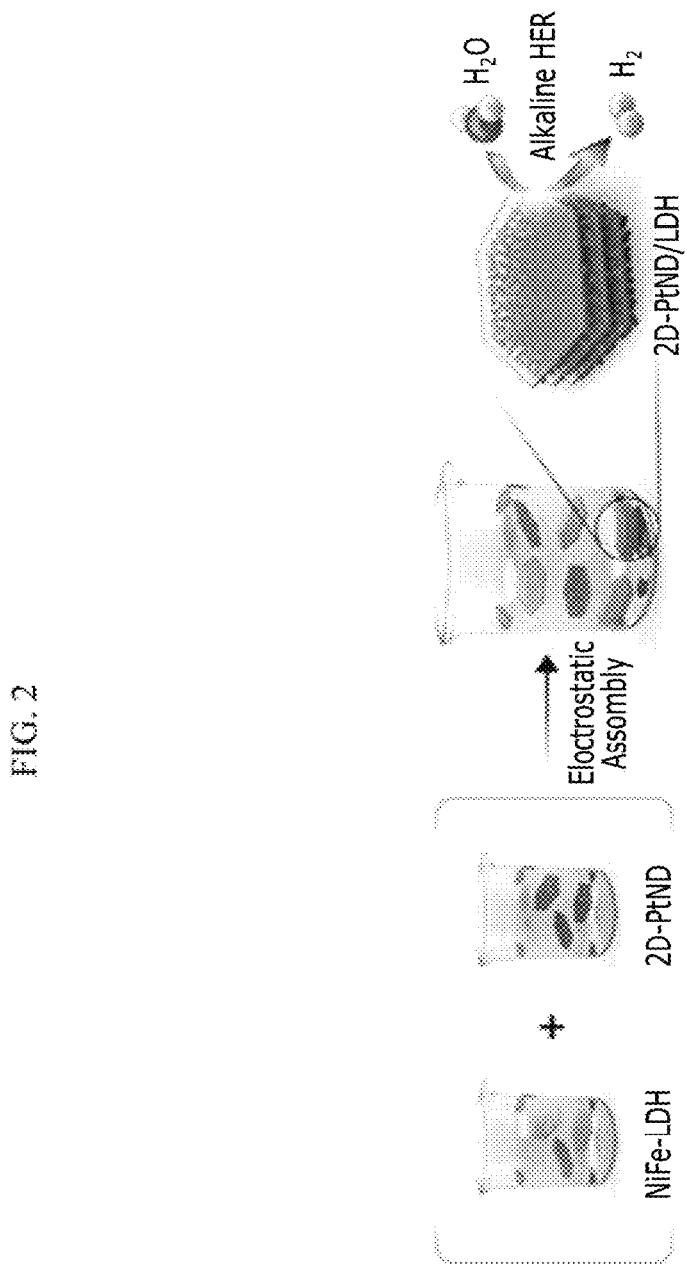
FIG. 2 is a schematic diagram illustrating a method for producing a nano-hybrid catalyst according to an exemplary embodiment of the present invention.
Figure 3:
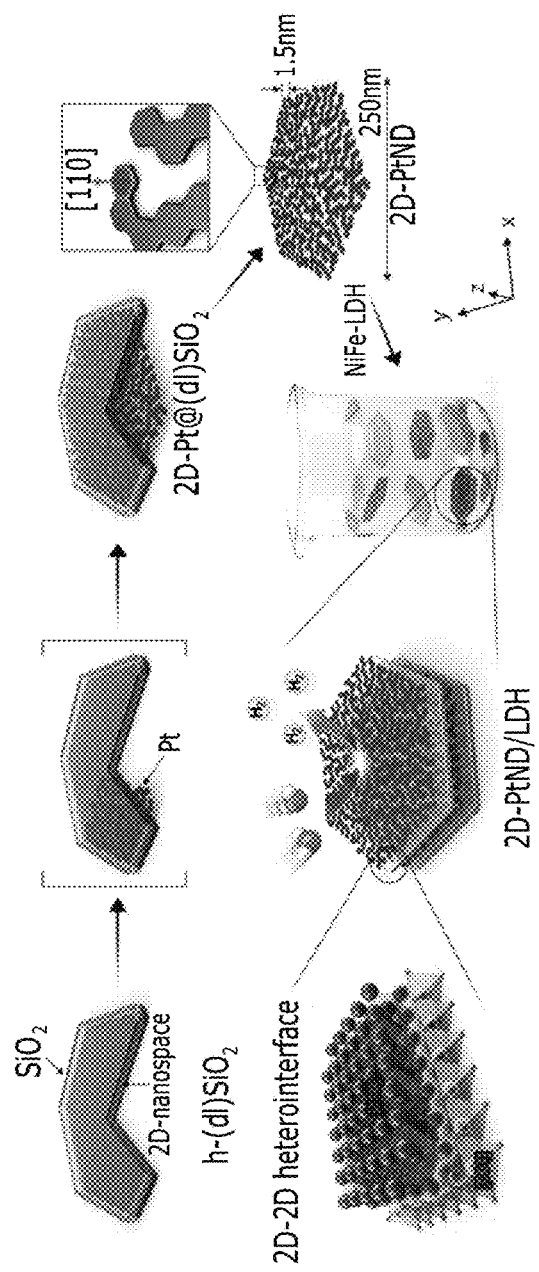
FIG. 3 is a schematic diagram showing a process for producing a nano-hybrid catalyst using a 2D hollow silica nanoreaction group according to an exemplary embodiment of the present invention.

FIG. 2 is a schematic diagram illustrating a method for producing a nano-hybrid catalyst according to an exemplary embodiment of the present invention.

As illustrated in FIG. 2, a method for producing a nano-hybrid catalyst according to an embodiment of the present invention includes preparing a colloidal solution of a 2D-PtND sheet; obtaining an aggregate by adding dropwise the colloidal solution of the 2D-PtND sheet to a formamide suspension of the NiFe-LDH sheet while stirring; and separating and washing the obtained aggregates. In this case, the step of washing the obtained aggregates may be repeatedly performed using deionized water and ethanol.

The colloidal solution of the 2D-PtND sheet may be added dropwise to the formamide suspension of the peeled NiFe-LDH sheet while stirring at a constant speed, and maintained at room temperature for 24 hours. In this case, the concentrations of the colloidal solution of the 2D-PtND sheet and the formamide suspension of the peeled NiFe-LDH may be in the range of 0.4 mg/mL. In addition, the colloidal solution of the 2D-PtND sheet and the formamide suspension of exfoliated NiFe-LDH may be mixed in the range of 0.4:1.0 to 0.6:1.0 by volume, and more specifically, 0.5:1.

Agglomerates generated through the mixing are recovered by centrifugation at 6,000 rpm, and washed repeatedly using deionized water and ethanol to finally obtain a 2D-PtND/LDH nano-hybrid catalyst.

Meanwhile, in the preparing of the colloidal solution of the 2D-PtND sheet, the aqueous suspension of the 2D-hollow silica nanoreaction group and $Na_2PtCl_4 \cdot xH_2O$ are mixed to obtain a mixed suspension, which may be stirred at room temperature for 10 minutes. Then, an acid solution may be added to the mixed suspension and stirred at a temperature of 70° C. for about 10 minutes to collect a black suspension as a first precipitate, that is, 2D-Pt@(dl)$SiO_2$ by centrifugation, washed several times with deionized water, and then, dispersed in deionized water. Then, the acid solution is mixed and stirred at room temperature for 24 hours to obtain 2D-PtND as a secondary precipitate. The 2D-PtND may be separated by centrifugation and washed several times with deionized water to obtain a purified final 2D-PtND. The final 2D-PtND may be dispersed in distilled water and stored.

In addition, the 2D-hollow silica nanoreaction group may be prepared by the following method. First, a mixed solution of polyoxyethylene (5) nonylphenyl ether (hereinafter referred to as IGEPAL CO-520) in cyclohexane is stirred for 10 minutes. In this case, the IGEPAL CO-520 and the cyclohexane may be mixed in a volume ratio of 1:25 to 1:40, specifically 1:30 to 1:35, and more specifically 1:33.

The aqueous suspension of the NiCo-LDH nanosheets was then added dropwise with stirring to produce a homogeneous inverse microemulsion. At this time, the added aqueous suspension of the NiCo-LDH nanosheets may be mixed in the range of 1:15 to 1:20 of the mixed solution of the IGEPAL CO-520 and the cyclohexane based on a volume, and specifically 1:17. In addition, the concentration of the aqueous suspension of the NiCo-LDH nanosheets may be 10 mg/mL to 15 mg/mL, and specifically 12.5 mg/mL.

Then, after 5 to 30 minutes, and specifically, 10 minutes, an $NH_4OH$ solution is added, and then, a silane mixture in which N-[3-(trimethoxysilyl)propyl]ethylenediamine (hereinafter referred to as TMSD) is mixed may be added to tetraethyl orthosilicate (hereinafter referred to as TEOS). The TMDS may be mixed in the range of 0.1% to 20% by volume of the total volume of the silane mixture of TEOS and TMSD, specifically 0.5% to 10% by volume, and more specifically 1% to 5%. When the mixing ratio of TMSD is within the above range, the 2D-PtND may be selectively prepared only inside the 2D hollow silica nanoreaction group, which is advantageous for producing the nano-hybrid catalyst with excellent quality.

In an embodiment of the present invention, by using 0.4, 0.8, 1.2, 1.6, and 2.0 μL of TMDS in 40 μL of the silane mixture, a volume percentage of TMSD ($P_{NH2}$=x) may vary to 1, 2, 3, 4, and 5%.

The produced solution is stirred for 24 hours, 25% of TEOS of the total volume of the silane mixture for pure silica shell growth is additionally added around LDH@$SiO_2$ ($NH_2$)$_x$ in which a silica shell layer modified with aminosilane is formed on a surface of NiCo-LDH nanosheets, the mixture is additionally stirred for 24 hours at room temperature, and then the precipitate is collected by centrifugation and washed with ethanol and deionized water, thereby obtaining LDH@(dl)$SiO_2$ nanosheets formed with a layered double silica shell.

The obtained LDH@(dl)$SiO_2$ nanosheets are dispersed in an acid solution, and specifically, 3 M HCl aqueous solution, and continuously stirred at room temperature for 1 hour to 5 hours, specifically for 2 hours to 4 hours, and more specifically for 3 hours to dissolve the LDH, that is, NiCo-LDH, thereby producing a 2D-hollow silica nanosheet including a layered double shell, that is, an h-(dl)$SiO_2$ nanosheet Then, the precipitate collected by centrifugation is repeatedly washed with deionized water to finally produce the h-(dl)$SiO_2$ nanosheet as the 2D-hollow nanoreact group designed according to an embodiment of the present invention.

The NiFe layered double hydroxide sheet includes $NiCl_2 \cdot 6H_2O$, $FeCl_2 \cdot 4H_2O$, anthraquinone-2-sulfonic acid sodium salt monohydrate (hereinafter referred to as AQS) and hexamethylenetetramine (hereinafter referred to as HMT) may be obtained by refluxing a uniform solution at a predetermined ratio to form the NiFe layered double hydroxide into which the AQS is inserted. The NiFe layered double hydroxide sheet into which the AQS is inserted is treated with an aqueous solution containing sodium dodecyl sulfate (SDS) to obtain the NiFe layered double hydroxide sheet into which dodecyl sulfate (DS) is inserted. Then, the NiFe layered double hydroxide sheet into which the DS is inserted is stirred in formamide for 2 days to peel off the single layer of the NiFe layered double hydroxide sheet. Here, the ratio of Ni/Fe in the produced NiFe layered double hydroxide may be the same as the ratio of the amount of the introduced metal salt, that is, $NiCl_2 \cdot 6H_2O$ and $FeCl_2 \cdot 4H_2O$. Meanwhile, the $NiCl_2 \cdot 6H_2O$ and the $FeCl_2 \cdot 4H_2O$ may be mixed in 2:1 based on a molar ratio of Ni and Fe.

Hereinafter, Examples and Comparative Examples of the present invention will be described in detail. However, it is to be understood that this exemplary embodiment is provided as an example, and the present invention is not limited by this exemplary embodiment, but is defined by only the scope of claims to be described below.

Preparation of Monolayer NiCo-LDH 10.0 mL of aqueous solution (concentration=0.32 M) containing a mixture of Ni $NO_{3,2} \cdot 6H_2O$ and Co $NO_{3,3} \cdot 6H_2O$ in a 3:1 molar ratio, 10.0 mL of SDS (0.58 M), and 20.0 mL of HMT (0.36 M) are mixed at room temperature. Then, the entire mixture is dissolved in 40 mL of Milli-Q water (18 mΩ), transferred to a Teflon-lined stainless-steel autoclave, and annealed in an oven preheated to 110° C. for 24 hours. A precipitate generated after the reaction, that is, (DS)NiCo-LDH, is collected by centrifugation, washed repeatedly with deionized water and ethanol, and then dried in air at a temperature of 60° C. to obtain (DS)NiCo-LDH powder. Then, the obtained (DS)NiCo-LDH powder was mixed with formamide (1 mg/mL) to peel off a DS host layer, and the produced suspension was heated at 40° C. for 24 hours without stirring. Then, the suspension is centrifuged at 2000 rpm, and the supernatant is repeatedly washed with ethanol and deionized water to finally maintain the monolayer NiCo-LDH dispersed in the aqueous solution. In this case, the thickness of the monolayer NiCo-LDH may be about 1 nm.

Preparation of h-(dl)$SiO_2$

At room temperature, 200 μL of IGEPAL CO-520 is placed in a vial containing 6.6 mL of cyclohexane and dispersed by stirring. After stirring for 10 minutes, an aqueous suspension of LDH (0.4 mL, 12.5 mg/mL) was added dropwise to a solution under stirring to produce a homogeneous inverse microemulsion system. After 10 minutes, a NH$_4$OH solution (28 to 30%, 33.4 μL) was added, followed by addition of TEOS mixture containing TMSD to the suspension at 10 min intervals to coat with an SiO$_2$ shell modified with aminosilane. The volume percentage of the TMSD (P$_{NH2}$=x) in the silane mixture (40 μL) was varied to 1, 2, 3, 4 and 5% using 0.4, 0.8, 1.2, 1.6, and 2.0 μL of TMDS.

After the produced solution is kept at room temperature for 24 hours, pure TEOS (10 μL) is added back to the suspension and then maintained for a certain time. Then, the produced solution is additionally stirred for 24 hours at room temperature for pure silica shell growth around LDH@SiO$_2$ NH$_{2x}$ initially formed in the reaction. The produced LDH@(dl)SiO$_2$ nanosheets were collected by centrifugation and washed with ethanol and deionized water.

Then, the LDH@(dl)SiO$_2$ nanosheets (1 mg/mL) are dispersed in a 3M HCl solution and continuously stirred at room temperature for 3 hours to selectively remove the LDH layer, so the produced h-(dl)SiO$_2$ nanosheets are collected by centrifugation and then washed repeatedly with deionized water.

Synthesis of NiFe Layered Double Hydroxide

A uniform solution of NiCl$_2$·6H$_2$O, FeCl$_2$·4H$_2$O, anthraquinone-2-sulfonic acid sodium salt monohydrate (AQS), and hexamethylenetetramine (HMT) is refluxed at the specified ratio, and thus, was obtained by forming the NiFe layered double hydroxide into which the AQS is inserted. The synthesized NiCo-LDH plate was treated with an aqueous ethanol solution containing SDS and exchanged for DS-form. Then, 20 mg of DS-inserted LDH was peeled off by stirring in 50 mL formamide for 2 days. Here, the ratio of the Ni/Fe ratio in the produced LDH was adjusted by changing the amounts of the introduced metal salts, that is, NiCl$_2$·6H$_2$O and FeCl$_2$·4H$_2$O to 4:1, 3:1, 2:1, 1:1, and 1:2.

Synthesis of 2D-PtND (2D-Pt@(dl)SiO$_2$ Nanosheets)

An aqueous suspension (0.5 mL, 2 mg/mL) of h-(dl)SiO$_2$ 2D-hollow nanoreaction group is mixed with Na$_2$PtCl$_4$·xH$_2$O (0.5 mL, 10.44 mM) and stirred at room temperature for 30 minutes. Next, an aqueous solution of ascorbic acid (0.5 mL, 10.44 mM) is added to the suspension at room temperature, and the mixture is stirred in a preheated oil bath at 70° C. for 10 minutes. Next, the produced black suspension, that is, 2D-Pt@(dl)SiO$_2$, is collected by centrifugation, washed several times with deionized water, and finally dispersed in deionized water.

To separate the 2D-Pt product from the silica shell, 2D-Pt@(dl)SiO$_2$ is mixed with HF (48 to 51%) and 2D-Pt@(dl)SiO$_2$ is stirred at room temperature for 24 hours. Next, the produced 2D-PtND (2D-Pt@(dl)SiO$_2$ nanosheets) is separated by centrifugation and washed thoroughly with deionized water. The purified 2D-PtND nanosheets were stored as an aqueous suspension for additional use.

Figure 4A:
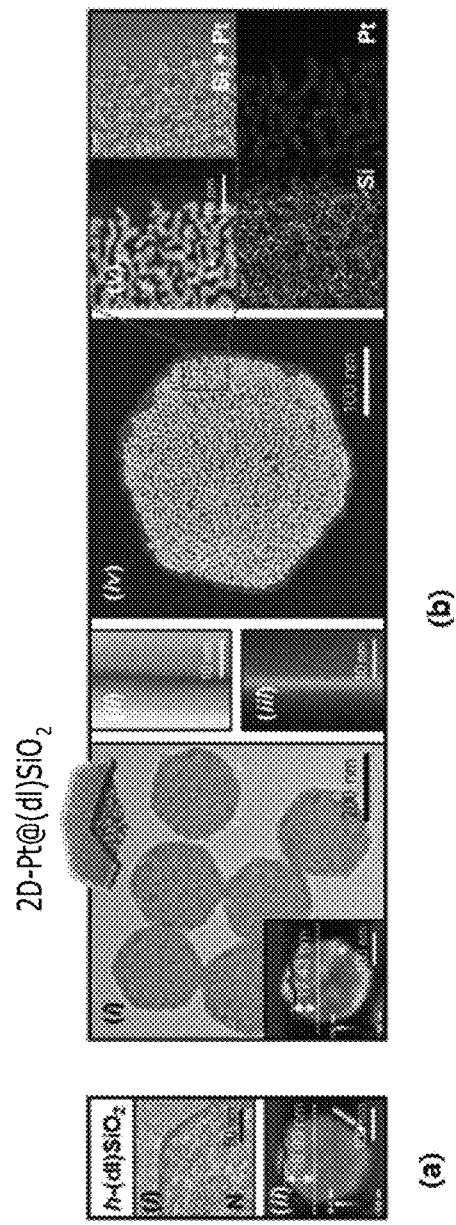
FIG. 4A is a schematic diagram illustrating a process of producing 2D-Pt using h-(dl)SiO$_2$ according to an exemplary embodiment of the present invention.

FIG. 4A is a schematic diagram illustrating a process of producing 2D-Pt using h-(dl)SiO$_2$ according to an exemplary embodiment of the present invention.

As illustrated in FIG. 4A, an inner surface of an inner space of the 2D hollow nanoreaction group h-(dl)SiO$_2$ (d=280±10 nm, t=16.9 nm) ((a) of FIG. 4A) according to an exemplary embodiment of the present invention is modified with aminosilane to promote affinity for Pt$^{2+}$ ions flowing into the inner space, thereby maintaining a high concentration of Pt$^{2+}$ ions. Therefore, the Pt$^{2+}$-coordination functional group may be optimized inside the h-(dl)SiO$_2$, which is advantageous for effectively forming the 2D-Pt inside the silica shell.

h-(dl)SiO$_2$ may accommodate Pt in the 2D nanospace between silica shell layers through ascorbic acid (AA) assisted reduction of Na$_2$PtCl$_4$ in the aqueous solution. That is, the h-(dl)SiO$_2$ induces the limited Pt formation in the space between the internally facing SiO$_2$(NH$_2$) layers to form 2D-Pt@(dl)SiO$_2$ (d=278±12 nm, t=17.43 nm) having a fully grown 2D-Pt structure (inset (i) in (b) of FIG. 4A).

As illustrated in the TEM analysis images of insets (ii) and (iii) in (b) of FIG. 4A, it can be seen that Pt protruding outside the silica shell layer of h-(dl)SiO$_2$ is not formed. In addition, as illustrated in the HAADF-STEM images of insets (iv) and (v), it can be seen that the 2D-Pt synthesized inside h-(dl)SiO$_2$ is formed as a dendrite composed of nano-branches interconnected in a direction parallel to the plane of the flat shell layer of h-(dl)SiO$_2$.

Figure 4B:
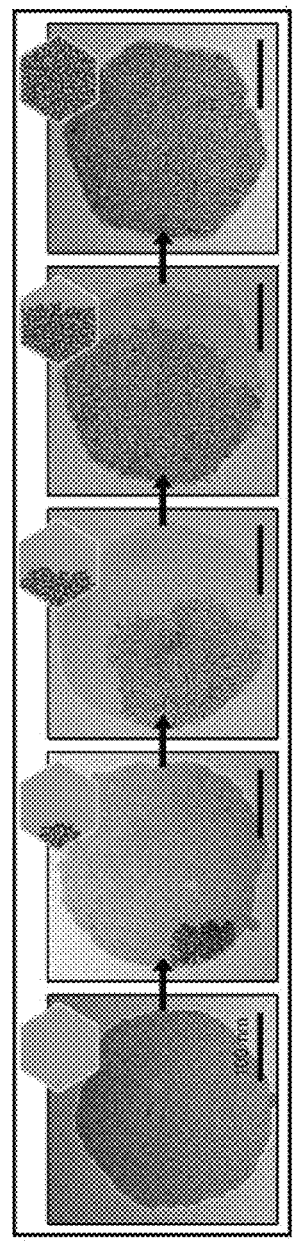
FIG. 4B is a schematic diagram showing a process of growing dendritic 2D-Pt in an inner space of h-(dl)SiO$_2$ according to an exemplary embodiment of the present invention.

FIG. 4B is a schematic diagram showing a process of growing dendritic 2D-Pt in an inner space of h-(dl)SiO$_2$ according to an exemplary embodiment of the present invention.

As illustrated in FIG. 4B, it was observed that the dendritic 2D-PtND starts near the edge of the inner space of h-(dl)SiO$_2$. It is believed that the 2D-PtND gradually grows and diffuses in the 2D nanospace between the silica shell layers, starting from a single seed preferentially nucleated in NH$_2$-bonded Pt$^{2+}$ species locally concentrated at the edge of the inner space of h-(dl)SiO$_2$. The 2D nanospace is filled by the gradually growing Pt islands, and finally, the 2D-PtND having the same shape, width, and thickness as the NiCo-LDH template used in the initial stage may be manufactured. In this case, the dendritic 2D-PtND may be grown by rapid reduction of Pt$^{2+}$ bonded with AA oxidation on the Pt surface.

Figure 5A:
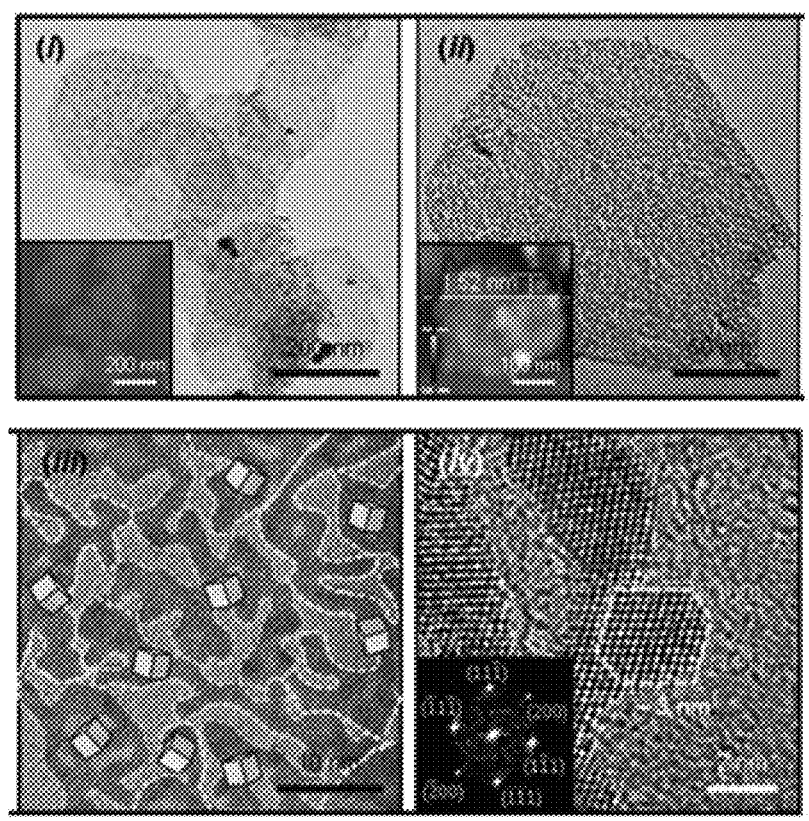
FIG. 5A shows a TEM image and an HRTEM image of a two-dimensional platinum (Pt) nanodendrite (2D-PtND) with a controlled crystal plane according to an exemplary embodiment of the present invention.

FIG. 5A illustrates a TEM image and an HRTEM image of the 2D-PtND according to an exemplary embodiment of the present invention.

As illustrated in the low-magnification TEM image (i) and the high-magnification TEM image (ii) of FIG. 5a, it showed a shape of a uniform nanosheet-having a width dimension (d=240±10 nm). The average thickness of the 2D-PtND measured by the AFM was on the order of 1.5 nm, which corresponds to a 3×4 Pt-atomic layer close to the estimated height of the 2D-hollow nanospace templated by a thin LDH with a thickness of less than 1 nm. As illustrated in the HRTEM image (iii) and the hexagonal plate-shaped Pt grain (iv) highlighting the grain boundary and the exposed surface of (110) in FIG. 5A, through TEM investigation, a flat layered structure composed of interconnected dendritic nanocrystalline branches (d is about 3 nm) on fcc-Pt may be confirmed.

Figure 5B:
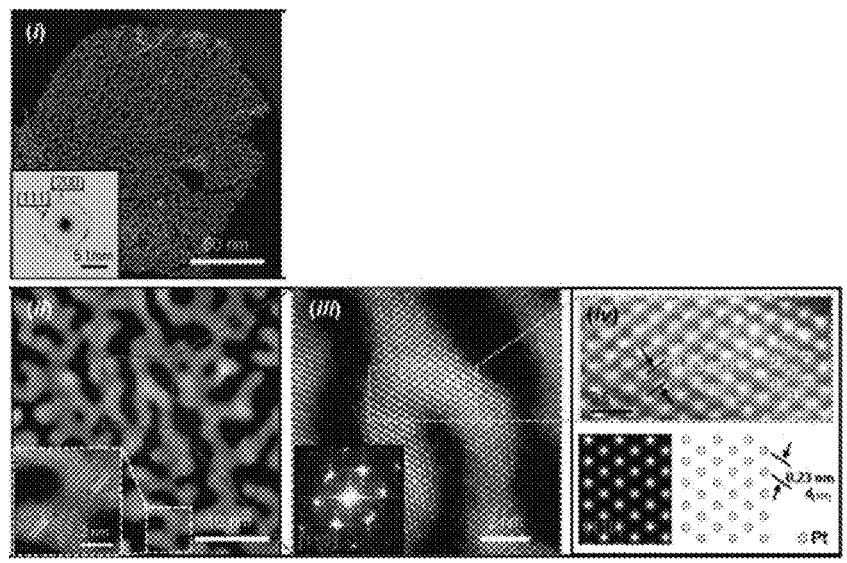
FIG. 5B is a diagram illustrating a HAADF-STEM image of a two-dimensional platinum (Pt) nanodendrite (2D-PtND) with a controlled crystal plane according to an exemplary embodiment of the present invention.

FIG. 5B illustrates an HAADF-STEM image of the 2D-PtND according to an exemplary embodiment of the present invention.

As illustrated in the low-magnification HAADF-STEM image (i) of the 2D-PtND of FIG. 5B, it may be seen that the 2D-PtND exhibits a flat and uniform sheet surface shape. The high-intensity selection region SAED pattern in the inset of the HAADF-STEM image (i) of the 2D-PtND corresponds to the dominant (111) crystal plane.

As illustrated in the magnified low-magnification HAADF-STEM image HAADF-STEM image (ii) of the 2D-PtND in FIG. 5B, the 2D-PtND nanosheets are composed of an epitaxial domain having tens of nanometers in size aligned with consistent in-plane culture exhibiting a lattice spacing of 0.23 nm, which was found to be consistent with the interplanar spacing of the (111) crystal plane.

As illustrated in the magnified 2D-PtND low-magnification HAADF-STEM image HAADF-STEM images (ii) and (iii) of FIG. 5B, since the HAADF-STEM is sensitive to changes in atomic number and thickness, high-resolution HAADF-STEM results showed uniform image contrast over the entire area, resulting in indicating atomically flat and uniform 2D surface shape of the 2D-PtND and coplanar alignment between nanobranches and epitaxial domains. By the STEM FFT analysis, it is also possible to confirm a minor axis direction of the {110} plane parallel to the 2D-PtND surface.

(iv) of FIG. 5B shows the experiment and simulated HAADF-STEM image of the 2D-PtND having a bright contrast region (blue ball of an atomic model) representing a Pt atomic position well decomposed at the measured lattice spacing of 0.23 nm corresponding to a Pt 111 interplanar spacing of the 2D-PtND according to an exemplary embodiment of the present invention along a 110 projection.

When all the above-described analyses are considered together, a unit branch of dendritic 2D-PtND has a shape of a hexagonal disk (d=3 nm, t=1.5 nm) surrounded by a (110) crystal surface of a basal plane and the surrounding (111) and (100) planes, which is essentially distinct from other reported Pt nanodendrites composed of 3D-shaped spherical or truncated octahedral units (see FIG. 10). A distinct characteristic of the 2D-PtND structure is that it is a full 2D structure on a bare LDH surface. A 2D nanospace played a defining role for the growth of a single disk-type unit structure. Surface integration of reduced Pt atoms was mostly promoted by growing a (111) facet, which is supplied with $Pt^{2+}$ precursors from adjacent open 2D nanospaces, but a precursor approach to the (110) surface was limited by the enclosed silica shell. It may be determined that the continuous budding and dendritic proliferation of new branches in the lateral direction from the hexagonal edge induced by the 2D nanospace may form an extended 2D-PtND with a large planar area of the (110) crystal surface.

Preparation of 2D-PtND/LDH 12.5 mL of aqueous dispersion of 2D-PtND (0.4 mg/mL) was added dropwise to a formamide suspension of peeled NiFe layered double hydroxide (25.0 mL, 0.4 mg/mL) under constant stirring, and maintained at room temperature for 24 hours. The produced aggregates were centrifuged at 6,000 rpm and recovered, and washed repeatedly with deionized water and ethanol to obtain a 2D-PtND/LDH nano-hybrid catalyst.

Figure 6A:
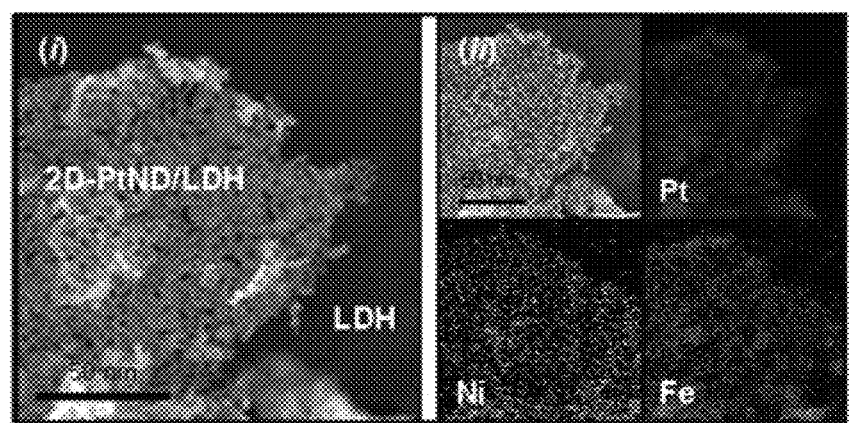
FIG. 6A is a diagram illustrating a HAADF-STEM image and an EDS elemental mapping image of 2D-PtND/LDH according to an exemplary embodiment of the present invention.

FIG. 6A is a diagram illustrating a HAADF-STEM image and an EDS elemental mapping image of 2D-PtND/LDH according to an exemplary embodiment of the present invention. In HAADF-STEM and energy dispersive spectroscopy (EDS) elemental mapping investigation of 2D-PtND/LDH, single-layer 2D-PtND nanosheets maintaining 2D dendritic morphology and fcc-Pt crystallinity were stacked on NiFe layered double hydroxide to form a wide and extended 2D-2D Pt/LDH heterointerface.

Figure 6B:
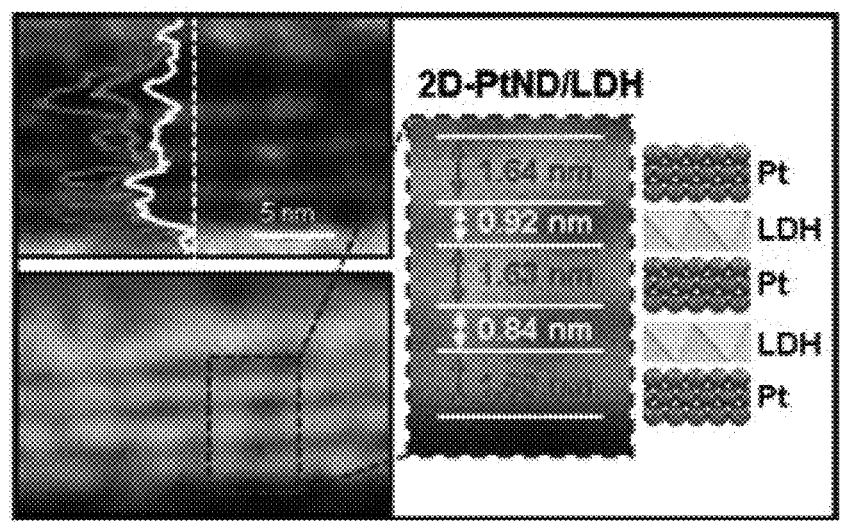
FIG. 6B is a diagram illustrating a cross-sectional TEM image and a HAADF-STEM image with an EDS line profile of 2D-PtND/LDH according to an exemplary embodiment of the present invention.
Figure 6C:
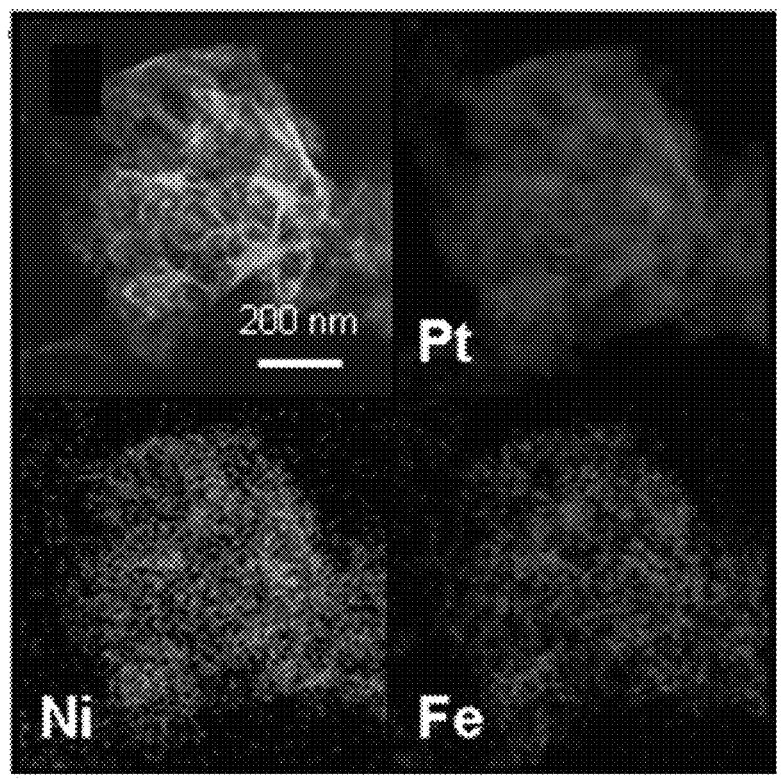
FIG. 6C is a diagram illustrating a HAADF-STEM image and an EDS elemental mapping image of 2D-PtND/LDH according to an exemplary embodiment of the present invention.

FIG. 6B is a diagram illustrating a cross-sectional TEM image and a HAADF-STEM image with an EDS line profile of 2D-PtND/LDH according to an exemplary embodiment of the present invention, and FIG. 6C is a diagram illustrating a HAADF-STEM image and an EDS elemental mapping image of 2D-PtND/LDH according to an exemplary embodiment of the present invention. As illustrated in FIGS. 6B and 6C, in the 2D-PtND/LDH according to the exemplary embodiment of the present invention, it may be seen that a heterogeneous interlayer structure of a single layer 2D-PtND and a single layer NiFe layered double hydroxide that are alternately stacked is formed.

Hydrogen Generation Reactor

On Autolab PGSTAT302N potentiostat workstation, electrochemical measurements were performed using a standard three-electrode electrochemical cell that uses a catalyst-deposited electrode as a working electrode and Ag/AgCl (saturated KCl) and graphite rods as reference and counter electrodes, respectively. The electrolyte is generally an $N_2$ saturated 1.0 M KOH electrolyte unless otherwise noted. Meanwhile, all electrochemical experiments were performed at room temperature.

Example 1

Working Electrode Including 2D-PtND/LDH Catalyst

For the manufacturing of the working electrode, 3 mg of 2D-PtND/LDH was dispersed in 1 mL of a solvent mixture containing DI water (700 μL), ethanol (264 μL) and Nafion (36 μL, 5 wt %) for 1 hour by sonication. Then, the prepared homogeneous catalyst ink (1 μL) was drop-cast onto a surface of GC RDE, generating catalyst loading of approximately 0.042 mg/cm$^2$; and then, drying the working electrode for about 12 hours before the electrochemical measurement.

Comparative Examples 1 and 2

Working Electrode Including 2D-PtND and 20% Pt/C Catalyst

A working electrode was manufactured in the same manner as in Example 1, except that the type of catalyst was changed to Pt/C and 2D-PtND.

For the cyclic stability test, a CV cycle was executed within the range of −0.2 to 0.0 V vs RHE potential for 10000 cycles, and then iR-corrected LSV curves for the beginning and after of the CV cycle were compared.

Figure 7A:
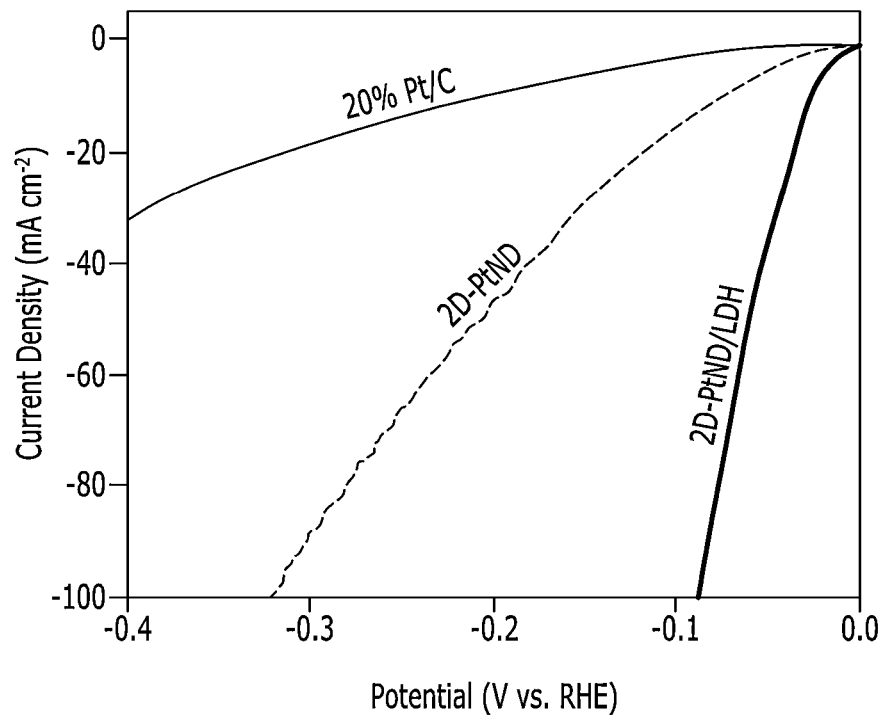
FIG. 7A is a diagram illustrating a 95% iR corrected linear sweep voltammetry (LSV) curve of 2D-PtND/LDH, 2D-PtND, and commercial 20% Pt/C according to an exemplary embodiment of the present invention.

FIG. 7A is a diagram illustrating a 95% iR corrected linear sweep voltammetry (LSV) curve of 2D-PtND/LDH, 2D-PtND, and commercial 20% Pt/C according to an exemplary embodiment of the present invention.

When using the working electrode (GC RDE) with the 2D-PtND/LDH according to Example 1, only overpotentials of 25 and 87 mV are required to reach current densities of 10 and 100 mA/cm$^2$ ($\eta_{10}$ and $\eta_{100}$), respectively, and showed the highest HER activity among the tested materials.

Figure 7B:
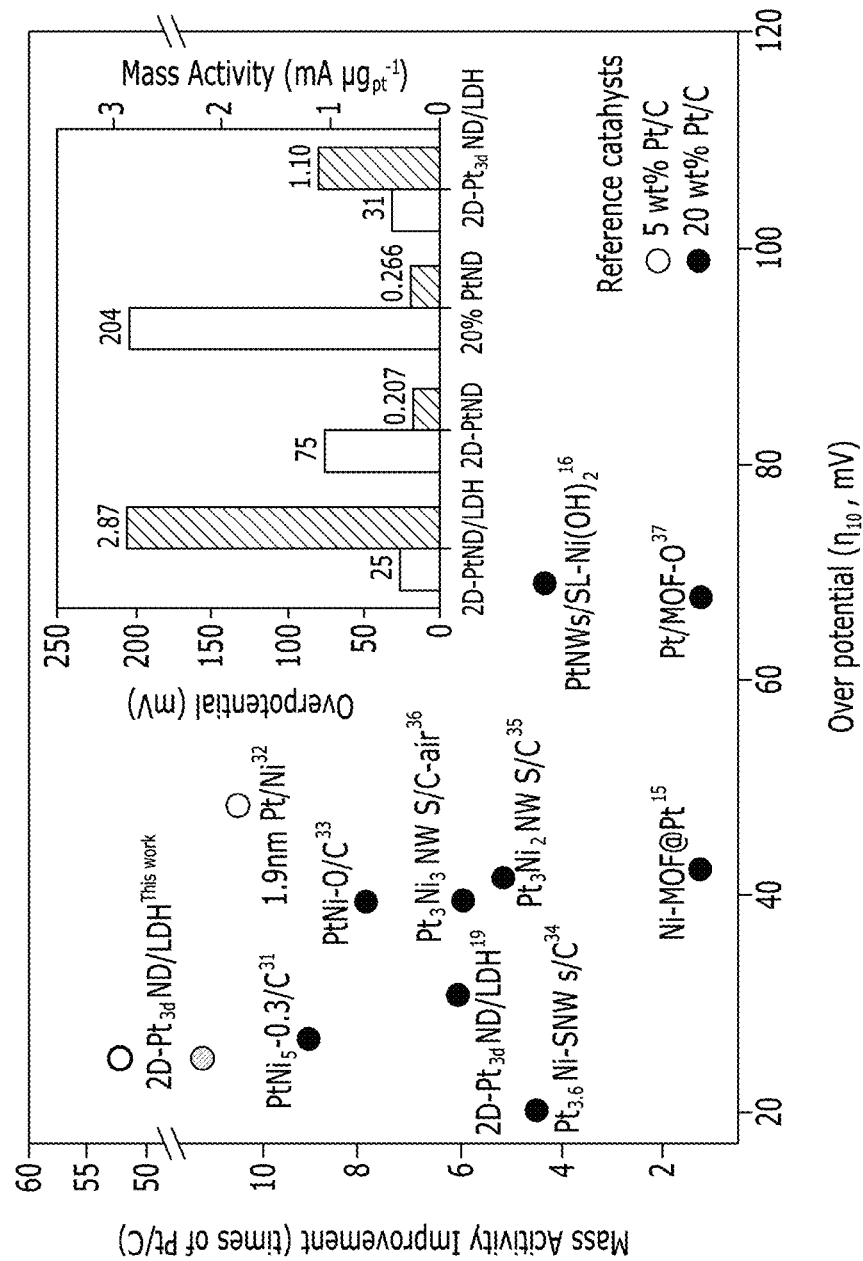
FIG. 7B illustrates a mass activity improvement plot for a reference catalyst (−0.07V vs. RHE) with respect to 2D-PtND/LDH and reported Pt/Ni-based alkaline HER electrocatalyst overpotentials (required to provide 10 mA/cm$^2$ current density).

FIG. 7B illustrates a mass activity improvement plot (Inset: Pt mass activity normalized at overpotential and −0.07V vs. RHE at 10 mA/cm$^2$ for various catalysts considered in the present study) for a reference catalyst (−0.07V vs. RHE) with respect to 2D-PtND/LDH and reported Pt/Ni-based alkaline HER electrocatalyst overpotentials (required to provide 10 mA/cm$^2$ current density). Referring to FIG. 7B, in terms of the Pt mass activity, the 2D-PtND/LDH catalyst indicated a value of 2.87 mA/μg$_{Pt}$ (at an overpotential of 70 mV), which was 11.21 times better than that of Pt/C.

Figure 7C:
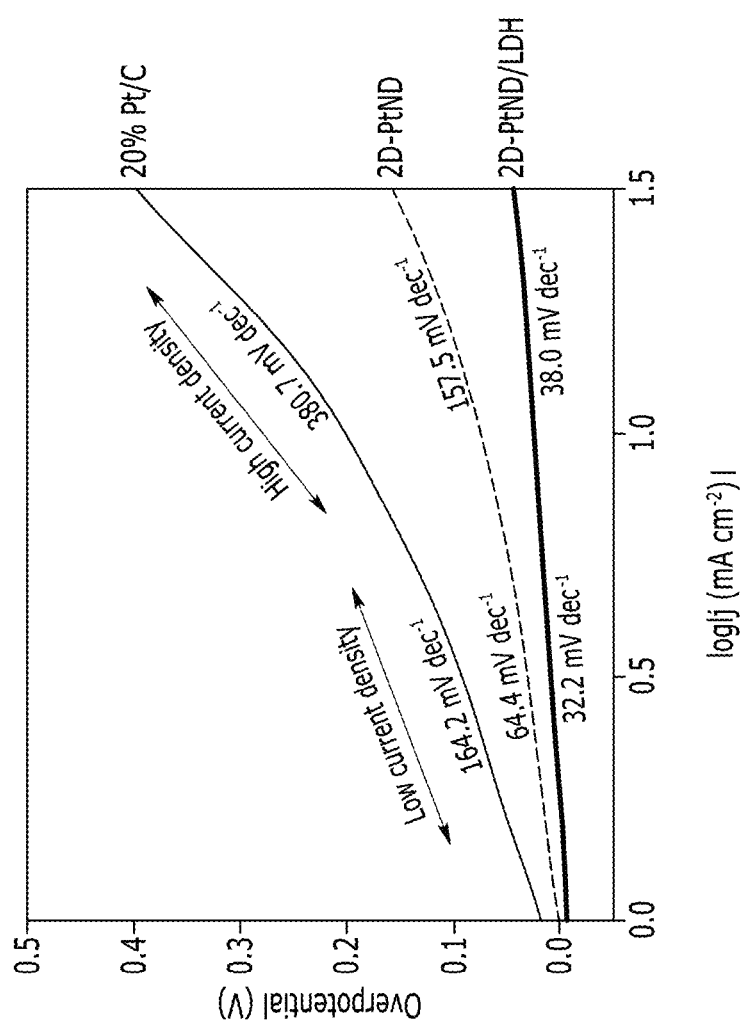
FIG. 7C is a diagram Tafel slopes estimated from iR-corrected LSV profiles of HER for 2D-PtND/LDH, 2D-PtND, and commercial 20% Pt/C at low and high current densities according to an exemplary embodiment of the present invention.

FIG. 7C is a diagram Tafel slopes estimated from iR-corrected LSV profiles of HER for 2D-PtND/LDH, 2D-PtND, and commercial 20% Pt/C at low and high current densities.

As illustrated in FIG. 7C, when using the working electrode applying the 2D-PtND/LDH according to the exemplary embodiment of the present invention, the smallest Tafel slope of 32.2 mV/dec, and NiFe layered double hydroxide were shown, and faster Volmer reaction ($H_2O + e^- \rightarrow H^* + HO^-$) and efficient chemical desorption may be confirmed by the NiFe double hydroxide layer. In addition, it can be seen that the Tafel step ($H_{ads} + H_{ads} \rightarrow H_2$) on the Pt surface completed the HER process through the fast Volmer-Tafel mechanism, which was well maintained even at high current density as reflected in the Tafel slope value of 38.0 mV/dec.

On the other hand, when using the working electrode applying 2D-PtND of Comparative Example 1 and 20% Pt/C of Comparative Example 2, the Tafel slope was as high as 64.4 mV/dec and 164.2 mV/dec, respectively, according to the Volmer-Heyrovsky process mainly for hydrogen production, and thus, it may be confirmed that high energy is required.

Figure 7D:
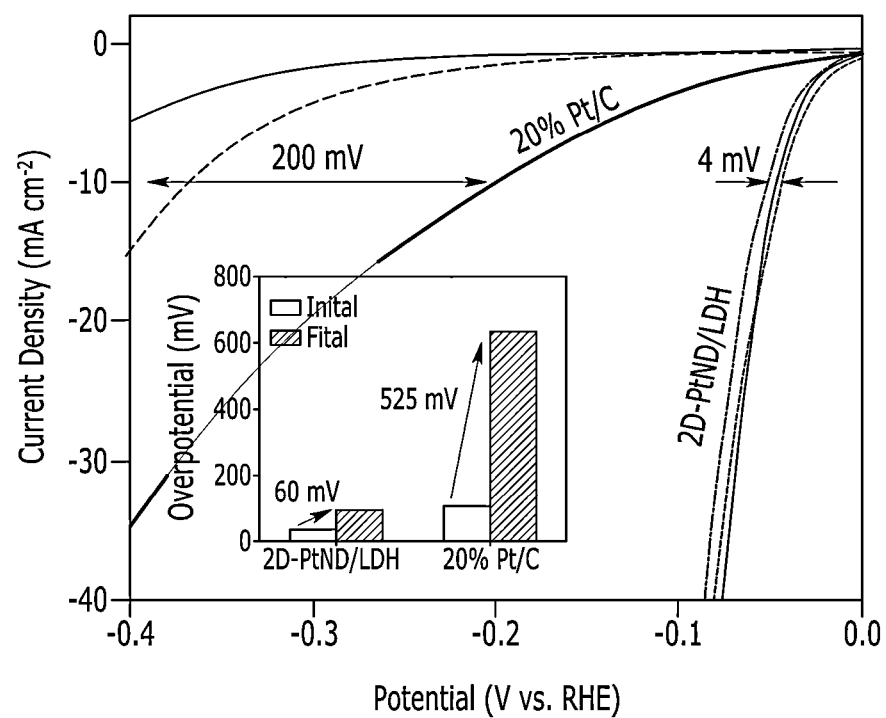
FIG. 7D is a diagram illustrating an LSV curve (solid line, dotted line, and dotted line-dot represent the LSV curve of the catalyst after an initial stage, 5000 and 10000 CV cycles, respectively) showing cyclic stability testing of 2D-PtND/LDH and 20% Pt/C after 10000 CV cycles according to an exemplary embodiment of the present invention.

FIG. 7D is a diagram illustrating an LSV curve (solid line, dotted line, and dotted line-dot represent the LSV curve of the catalyst after an initial stage, 5000 and 10000 CV cycles, respectively) showing cyclic stability testing of 2D-PtND/LDH and 20% Pt/C after 10000 CV cycles according to an exemplary embodiment of the present invention (Inset: Change in overpotential at 10 mA cm$^{-2}$ current density during stability testing of catalysts via a chronopotentiometer (CP) method).

As illustrated in FIG. 7D, when using the working electrode to which the 2D-PtND/LDH catalyst according to Example 1 of the present invention is applied, the polarization curves remain almost unchanged with the increment of 4 mV and 18 mV with respect to $\eta_{10}$ and $\eta_{100}$, respectively, after 10000 CV cycles. In addition, the stable performance was also provided in the chronopotentiometric (CP) test, which recorded a potential versus time plot for the material at a constant current density of 10 mA/cm$^2$ for 24 hours, confirming the stability of the catalyst composed of large heterointerface.

On the other hand, when using the working electrode to which the 20% Pt/C catalyst according to Comparative Example 2 is applied, it could be seen that the sweep causes a substantial decrease in activity with a very large overpotential drop of $\Delta\eta 10 > 200$ mV which may be caused by weakening of the physical contact between the Pt nanoparticles and the carbon support.

The present invention is not limited to the exemplary embodiments, but may be manufactured in a variety of different forms, and the present invention may be manufactured in a variety of different forms, and those of ordinary skill in the art to which the present invention pertains will understand that the present invention may be implemented in other specific forms without changing the technical spirit or essential features of the present invention. Therefore, it should be understood that the above-mentioned exemplary embodiments are exemplary in all aspects but are not limited thereto.

The invention claimed is:

1. A nano-hybrid catalyst, comprising:
a two-dimensional platinum (Pt) nanodendrite sheet with a controlled crystal plane; and
a NiFe layered double hydroxide nanosheet layer,
wherein the two-dimensional platinum (Pt) nanodendrite sheet with the controlled crystal plane and the NiFe layered double hydroxide nanosheet layer are alternately stacked, and
wherein in the two-dimensional platinum (Pt) nanodendrite sheet with the controlled crystal plane, each of Pt nanocrystals has a shape of a hexagonal disk surrounded by a (110) crystal surface as a basal plane, a (111) plane and a (100) plane, and the Pt nanocrystals are interconnected via the (111) plane, and the (110) crystal surface is exposed.

2. The nano-hybrid catalyst of claim 1, wherein:
an average width of the (110) crystal surface is in a range of 2.0 nm to 3.5 nm, and
a thickness of the hexagonal disk is in a range of 1.0 nm to 2.0 nm based on the (110) crystal surface.

3. The nano-hybrid catalyst of claim 1, wherein:
in the two-dimensional platinum (Pt) nanodendrite sheet with the controlled crystal plane, based on a widest surface,
an average width is in a range of 200 nm to 300 nm, and a thickness is in the range of 1.0 nm to 2.0 nm.

4. The nano-hybrid catalyst of claim 1, wherein:
in the NiFe layered double hydroxide nanosheet layer, based on a widest surface,
an average width is in a range of 150 nm to 200 nm, and an average thickness is in a range of 0.5 nm to 1.0 nm.

5. The nano-hybrid catalyst of claim 1, wherein:
the crystal surface of the Pt nanocrystals of the two-dimensional platinum (Pt) nanodendrite sheet with the controlled crystal plane,
is in close contact with a (001) plane of the NiFe layered double hydroxide nanosheet layer.

6. A method for manufacturing the nano-hybrid catalyst according to claim 1, comprising:
preparing a colloidal solution of the two-dimensional platinum (Pt) nanodendrite sheet with the controlled crystal plane;
obtaining agglomerates by adding dropwise the colloidal solution of the two-dimensional platinum (Pt) nanodendrite sheet with the controlled crystal plane to a formamide suspension of the NiFe layered double hydroxide sheet while stirring; and
separating and washing the obtained agglomerates.

7. The method of claim 6, wherein:
the preparing of the colloidal solution of the two-dimensional platinum (Pt) nanodendrite sheet with the controlled crystal plane includes:
mixing an aqueous suspension of a 2D-hollow silica nanoreaction group with $Na_2PtCl_4 \cdot xH_2O$ to obtain a mixed suspension;
adding an acid solution to the mixed suspension and stirring the mixture under heating conditions to obtain a first precipitate;
separating and washing the first precipitate and then mixing the acid solution to obtain a second precipitate; and
separating and washing the second precipitate to obtain the two-dimensional platinum (Pt) nanodendrite sheet with the controlled crystal plane and mixing the two-dimensional platinum (Pt) nanodendrite sheet with the controlled crystal plane with distilled water.

8. The method of claim 7, wherein:
the 2D-hollow silica nanoreaction group is manufactured by obtaining silica on a surface of a NiCo layered double hydroxide nanosheet to obtain a NiCo layered double hydroxide nanosheet (LDH@(dl)SiO$_2$) formed with a layered double silica shell, and dispersing the NiCo layered double hydroxide nanosheet (LDH@(dl)SiO$_2$) formed with the layered double silica shell layer in the acid solution to obtain a 2D-hollow silica nanosheet (h-(dl)SiO$_2$) including a layered double shell from which the NiCo layered double hydroxide nanosheet is removed.

9. The method of claim 8, wherein:

in the coating of the silica on the surface of the NiCo layered double hydroxide nanosheet to obtain the NiCo layered double hydroxide nanosheet (LDH@(dl)SiO$_2$) formed with the layered double silica shell, after forming the silica shell layer modified with aminosilane on the surface of the NiCo layered double hydroxide nanosheet, a pure silica shell layer is additionally formed around the silica shell layer modified with the aminosilane.

10. The method of claim 9, wherein:

in the forming of the silica shell layer modified with the aminosilane on the surface of the NiCo layered double hydroxide nanosheet, after adding dropwise the aqueous suspension of the NiCo layered double hydroxide nanosheet to a mixed solution of IGEPAL CO-520 and cyclohexane while stirring to obtain a suspension, the silica shell layer modified with the aminosilane is formed by adding a mixture of TMSD and TEOS to a silane mixture and maintaining the mixture for a predetermined time while stirring.

11. The method of claim 10, wherein:

the silane mixture is the mixture of the TMSD and TEOS in a range of 1:99 to 5:95 by volume.

12. The method of claim 9, wherein:

in the additionally forming of the pure silica shell layer around the silica shell layer modified with the aminosilane, after forming the silica shell layer modified with aminosilane on the surface of the NiCo layered double hydroxide nanosheet, the TEOS is added and maintained for a predetermined time while stirring.

13. The method of claim 6, wherein:

the NiFe layered double hydroxide is manufactured by mixing NiCl$_2$·6H$_2$O, FeCl$_2$·4H$_2$O, AQS, and HMT in a predetermined ratio to obtain a NiFe layered double hydroxide sheet into which the AQS is inserted, treating the NiFe layered double hydroxide into which the AQS is inserted with an aqueous ethanol solution containing SDS to obtain the NiFe layered double hydroxide into which DS is inserted, and mixing the NiFe layered double hydroxide into which the DS is inserted in formamide and stirring the mixture, and the NiCl$_2$·6H$_2$O and the FeCl$_2$·4H$_2$O are mixed in 2:1 based on a molar ratio of Ni and Fe.

* * * * *